United States Patent
Zhang et al.

(10) Patent No.: US 11,025,903 B2
(45) Date of Patent: Jun. 1, 2021

(54) CODING VIDEO DATA USING DERIVED CHROMA MODE

(71) Applicant: QUALCOMM Incorporated, San Diego, CA (US)

(72) Inventors: Li Zhang, San Diego, CA (US); Wei-Jung Chien, San Diego, CA (US); Xin Zhao, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 65 days.

(21) Appl. No.: 15/868,821

(22) Filed: Jan. 11, 2018

(65) Prior Publication Data

US 2018/0205946 A1     Jul. 19, 2018

Related U.S. Application Data

(60) Provisional application No. 62/446,270, filed on Jan. 13, 2017.

(51) Int. Cl.
*H04N 19/103*     (2014.01)
*H04N 19/593*     (2014.01)
(Continued)

(52) U.S. Cl.
CPC ........... *H04N 19/103* (2014.11); *H04N 19/11* (2014.11); *H04N 19/136* (2014.11);
(Continued)

(58) Field of Classification Search
USPC ..................................................... 375/240.2
See application file for complete search history.

(56) References Cited

U.S. PATENT DOCUMENTS

| | | | | |
|---|---|---|---|---|
| 2011/0255591 A1* | 10/2011 | Kim | ..................... | H04N 19/107 375/240.02 |
| 2012/0263229 A1* | 10/2012 | Lim | ..................... | H04N 19/503 375/240.02 |

(Continued)

OTHER PUBLICATIONS

C. Yeo, Y. H. Tan, Z. Li and S. Rahardja, "Chroma intra prediction using template matching with reconstructed luma components," 2011 18th IEEE International Conference on Image Processing, Brussels, 2011, pp. 1637-1640.*

(Continued)

*Primary Examiner* — Mohammed S Rahaman
(74) *Attorney, Agent, or Firm* — Shumaker & Sieffert, P.A.

(57) ABSTRACT

An example device for decoding video data includes a memory for storing video data, and one or more processors implemented in circuitry and configured to construct an intra-prediction candidate list for a current chroma block of the video data indicating candidate intra-prediction modes for the current chroma block, wherein the intra-prediction candidate list indicates a subset of allowed luminance (luma) candidate intra-prediction modes, determine cost (e.g., sum of absolute transform difference (SATD)) values for each of the candidate intra-prediction modes in the intra-prediction candidate list for the current chroma block, and generate a prediction block for the current chroma block using one of the candidate intra-prediction modes indicated by the intra-prediction candidate list according to the cost values (e.g., the candidate intra-prediction mode having the lowest cost value).

26 Claims, 13 Drawing Sheets

(51) Int. Cl.
  H04N 19/136    (2014.01)
  H04N 19/186    (2014.01)
  H04N 19/157    (2014.01)
  H04N 19/11     (2014.01)
(52) U.S. Cl.
  CPC ......... H04N 19/157 (2014.11); H04N 19/186 (2014.11); H04N 19/593 (2014.11)

(56) References Cited

U.S. PATENT DOCUMENTS

| | | | | |
|---|---|---|---|---|
| 2012/0287995 | A1* | 11/2012 | Budagavi | H04N 19/11 375/240.12 |
| 2012/0328013 | A1* | 12/2012 | Budagavi | H04N 19/105 375/240.12 |
| 2014/0010293 | A1* | 1/2014 | Srinivasan | H04N 19/119 375/240.12 |
| 2014/0086323 | A1* | 3/2014 | Chuang | H04N 19/159 375/240.12 |
| 2014/0105276 | A1* | 4/2014 | Nakamura | H04N 19/159 375/240.02 |
| 2014/0355667 | A1* | 12/2014 | Lei | H04N 19/159 375/240.02 |
| 2015/0078447 | A1* | 3/2015 | Gamei | H04N 19/122 375/240.12 |
| 2017/0214912 | A1* | 7/2017 | Cote | H04N 19/11 |
| 2017/0339404 | A1* | 11/2017 | Panusopone | H04N 19/107 |

OTHER PUBLICATIONS

X. Zhang, C. Gisquet, E. François, F. Zou and O. C. Au, "Chroma Intra Prediction Based on Inter-Channel Correlation for HEVC," in IEEE Transactions on Image Processing, vol. 23, No. 1, pp. 274-286, Jan. 2014.*

Sang Heon Lee, Jae Won Moon, Jae Woan Byun and Nam Ik Cho, "A new intra prediction method using channel correlations for the H.264/AVC intra coding," 2009 Picture Coding Symposium, Chicago, IL, 2009, pp. 1-4.*

X. Zhang, O. C. Au, J. Dai, C. Pang and F. Zou, "New chroma intra prediction modes based on linear model for HEVC," 2012 19th IEEE International Conference on Image Processing, Orlando, FL, 2012, pp. 197-200.*

Tao Zhang, Xiaopeng Fan, Debin Zhao and Wen Gao, "Improving chroma intra prediction for HEVC," 2016 IEEE International Conference on Multimedia & Expo Workshops (ICMEW), Seattle, WA, 2016, pp. 1-6.*

• Han et al.: "Decoder-Side Direct Mode Prediction", 5. JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,, No. JVETE0027, Jan. 3, 2017 (Jan. 3, 2017).*

Zhang L., et al., "EE5: Multiple Direct Modes for Chroma Intra Coding", 5th JVET Meeting; Jan. 12, 2017-Jan. 20, 2017; Geneva; (The Joint Video Exploration Team of ISO/IEC JTC1/SC29/WG11 and ITU-T SG.16 ); URL: http://phenix.int-evry.fr/jvet/, No. JVET-E0062, Jan. 4, 2017 (Jan. 4, 2017), XP030150543, 4 pp.

Seregiv V., et al., "Neighbor based intra most probable modes list derivation," JVET Meeting; Geneva, CH; May 26, 2016-Jun. 1, 2016; (The Joint Video Exploration Team of ISO/IEC JTC1/SC29/WG11 and ITU-T SG.16), JVET-C0055, 16, May 2016; 4 pp.

International Search Report and Written Opinion—PCT/US2018/013572—ISA/EPO—dated Mar. 16, 2018—15 pp.

Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.

* cited by examiner

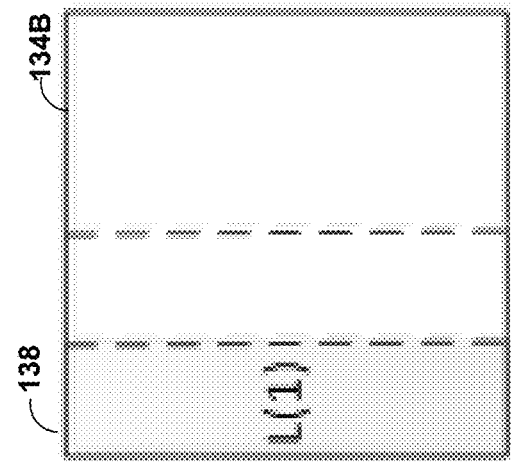
FIG. 3B: Chroma QTBT Structure
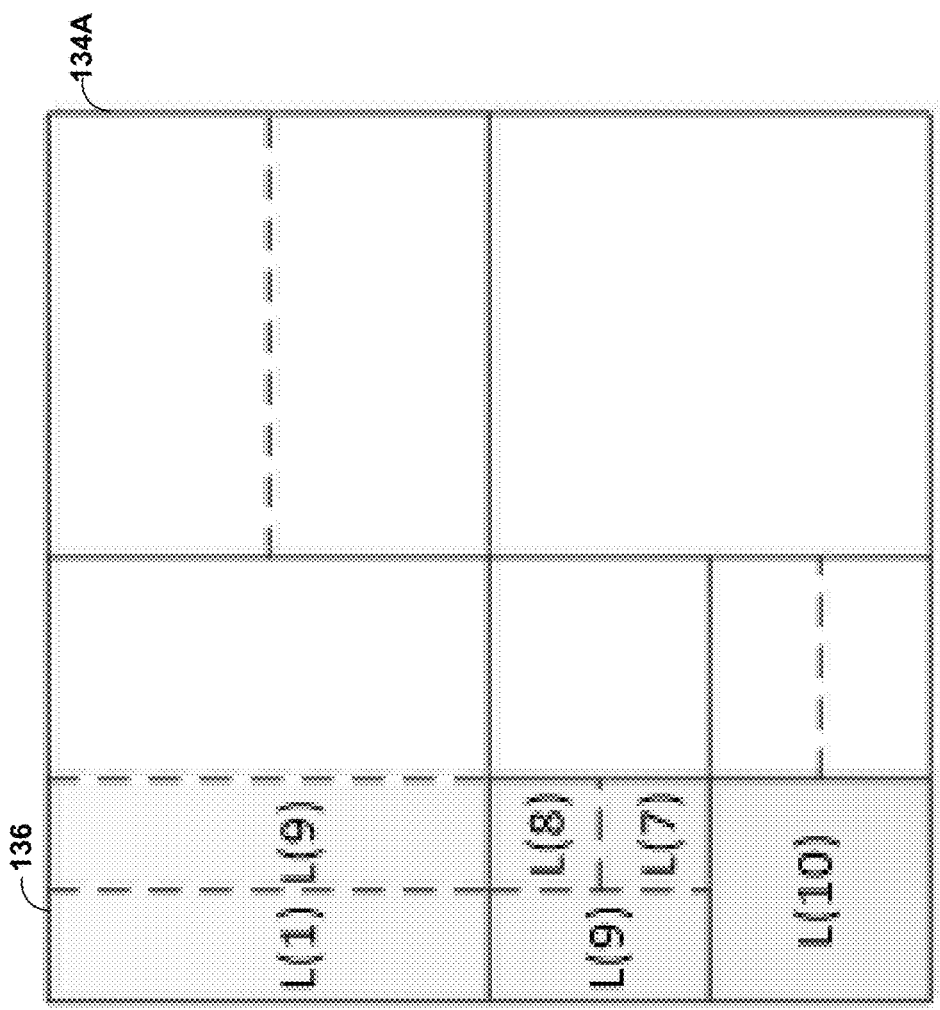
FIG. 3A: Luma QTBT Structure

CODING VIDEO DATA USING DERIVED CHROMA MODE

This application claims the benefit of U.S. Provisional Application No. 62/446,270, filed Jan. 13, 2017, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to intra-prediction for image and/or video coding, and more particularly, intra-prediction of chrominance (chroma) blocks of video data. According to the techniques of this disclosure, a decoder may derive a chroma coding mode, without the use of explicit signaling. These techniques may be used in the context of advanced video codecs, such as extensions of HEVC or the next generation of video coding standards.

In one example, a method of decoding video data includes constructing an intra-prediction candidate list for a current chroma block of video data indicating candidate intra-prediction modes for the current chroma block, wherein the intra-prediction candidate list indicates a subset of allowed luminance (luma) candidate intra-prediction modes, determining cost values, such as sum of absolute transform difference (SATD) values, for each of the candidate intra-prediction modes indicated by the intra-prediction candidate list for the current chroma block, and generating a prediction block for the current chroma block using one of the candidate intra-prediction modes indicated by the intra-prediction candidate list according to the cost values, e.g., the candidate intra-prediction mode having a lowest cost value.

In another example, a device for decoding video data includes a memory for storing video data, and one or more processors implemented in circuitry and configured to construct an intra-prediction candidate list for a current chroma block of the video data indicating candidate intra-prediction modes for the current chroma block, wherein the intra-prediction candidate list indicates a subset of allowed luminance (luma) candidate intra-prediction modes, determine cost values for each of the candidate intra-prediction modes indicated by the intra-prediction candidate list for the current chroma block, and generate a prediction block for the current chroma block using one of the candidate intra-prediction modes indicated by the intra-prediction candidate list according to the cost values.

In another example, a device for decoding video data includes means for constructing an intra-prediction candidate list for a current chroma block of video data indicating candidate intra-prediction modes for the current chroma block, wherein the intra-prediction candidate list indicates a subset of allowed luminance (luma) candidate intra-prediction modes, means for determining cost values for each of the candidate intra-prediction modes indicated by the intra-prediction candidate list for the current chroma block, and means for generating a prediction block for the current chroma block using one of the candidate intra-prediction modes indicated by the intra-prediction candidate list according to the cost values.

In another example, a computer-readable storage medium is encoded with instructions that, when executed, cause a programmable processor to construct an intra-prediction candidate list for a current chroma block of video data indicating candidate intra-prediction modes for the current chroma block, determine cost values for each of the candidate intra-prediction modes indicated by the intra-prediction candidate list for the current chroma block, and generate a prediction block for the current chroma block using one of the candidate intra-prediction modes indicated by the intra-prediction candidate list according to the cost values.

The details of one or more examples are set forth in the accompanying drawings and the description below. Other features, objects, and advantages will be apparent from the description, drawings, and claims.

BRIEF DESCRIPTION OF DRAWINGS

FIGS. 3A and 3B are conceptual diagrams illustrating example QTBT structures for luma and chroma blocks.

DETAILED DESCRIPTION

Figure 1:
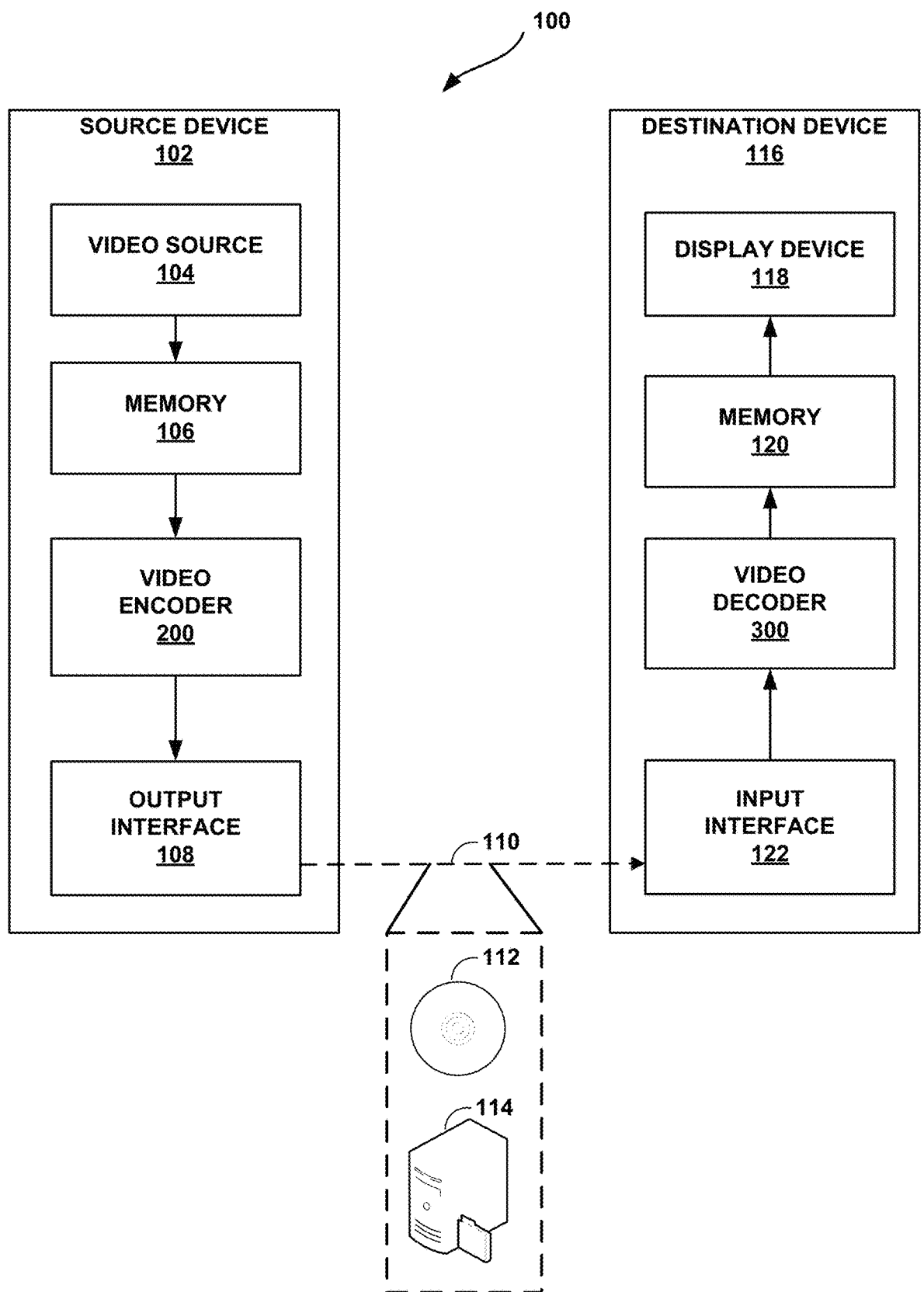
FIG. 1 is a block diagram illustrating an example video encoding and decoding system that may perform the techniques of this disclosure.

In general, the techniques of this disclosure relate to coding (encoding or decoding) of image and/or video data. This disclosure primarily describes techniques in the context of video coding, but it should be understood that these techniques may also be applied to image coding. Thus, where video coding techniques are described, it should be understood that image coding techniques may generally be substituted. Video data includes a series of pictures, which generally include color pictures. A raw color picture may be represented by pixels in a red-green-blue (RGB) color space. A video encoder or front-end unit may process (e.g., convert) a raw color picture to a luminance (luma) and chrominance (chroma) color space, e.g., one set of luma information and two sets of chroma information, one for blue-hue chroma and another for red-hue chroma. This luminance and chrominance color space may also be referred to as YUV or YCbCr. The video encoder may then encode the luma and chroma.

Moreover, video and image coding techniques generally include dividing a picture into blocks and coding each block by predicting the block and coding data representing differences (that is, a residual) between the block and its prediction. A video coder may predict a block using intra-prediction (using information from only the same picture) or inter-prediction (using information from other, previously coded pictures).

The techniques of this disclosure generally include techniques for determining an intra-prediction mode to be applied to predict a chroma block of video data. Rather than coding data signaling the intra-prediction mode, this disclosure describes techniques for determining (or deriving) the intra-prediction mode for a chroma block of video data implicitly, i.e., without explicit signaling (by a source device) or receipt of signaled data (by a destination device) of the mode. By deriving the coding mode in this manner, the techniques of this disclosure may reduce an amount of data signaled in a bitstream including coded video data, without overly increasing the complexity of the video coding process. In this manner, the techniques may improve the field of video coding, in that bitrate may be reduced without overly increasing an amount of processing needed to perform these techniques. Moreover, the techniques of this disclosure reduce the processing requirements of previously proposed techniques for decoder-derived chroma intra-prediction modes, thereby further improving the field of video coding.

In particular, Yu Han, Jicheng An, Jianhua Zheng, "Decoder-Side Direct Mode Prediction," JVET-E0027, describes a decoder-side derived direct mode (DDM) technique for the JVET exploration model (JEM). As discussed in greater detail below, the DDM technique of JVET-E0027 includes an iterative search process and a process for downsampling a luma block to calculate a sum of absolute transform difference (SATD) value. This disclosure recognizes that the iterative search at the encoder and decoder sides may introduce too much complexity for both software and hardware implementations of the DDM techniques. Additionally, this disclosure recognizes that even using a six-tap filter to downsample a luma block for the SATD calculation, the complexity of using a downsampled block may still be too much for larger coding blocks, e.g., where the coding block size is equal to 64×64. The techniques of this disclosure reduce these complexities, thereby improving the field of video coding.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The HEVC specification is available from phenix.int-evry.fr/jct/doc_end_user/documents/14_Vienna/wg11/JCTVC-N1003-v1.zip. The specification of HEVC and its extensions including Format Range (RExt), Scalability (SHVC), and Multi-View (MV-HEVC) Extensions and Screen Content Extensions is available from phenix.int-evey.fr/jct/doc_end_user/current_document.php?id=10481.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET reference software, i.e., Joint Exploration Model 4 (JEM 4), is available from jvet.hhi.fraunhofer.de/svn/svn_HMJEMSoftware/tags/HM-16.6-JEM-4.0/. J. Chen, E. Alshina, G. J. Sullivan, J.-R. Ohm, J. Boyce "Algorithm description of Joint Exploration Test Model 4", JVET-D1001, Chengdu, October 2016, provides an algorithm description for JEM4.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deriving chroma intra-prediction modes. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for deriving chroma intra-prediction modes. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In some examples, JEM also includes an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various angular modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may derive intra-prediction modes for chroma blocks, without explicitly coding data representing the intra-prediction modes for the chroma blocks. For example, as discussed above, NET-E0027 describes a six-tap downsampling filter and an iterative search process for deriving intra-prediction modes for chroma blocks. In accordance with the techniques of this disclosure, however, video encoder 200 and video decoder 300 may use different down-sample ratios for blocks (corresponding luma or chroma neighboring blocks) for decoder-side intra-prediction mode derivation. In one example, the ratio may depend on the sizes of coding blocks. That is, video encoder 200 and video decoder 300 may select the ratio as a function of the size of a coding block. In another example, video encoder 200 and video decoder 300 may apply different filtering methods for various blocks.

Figure 5:
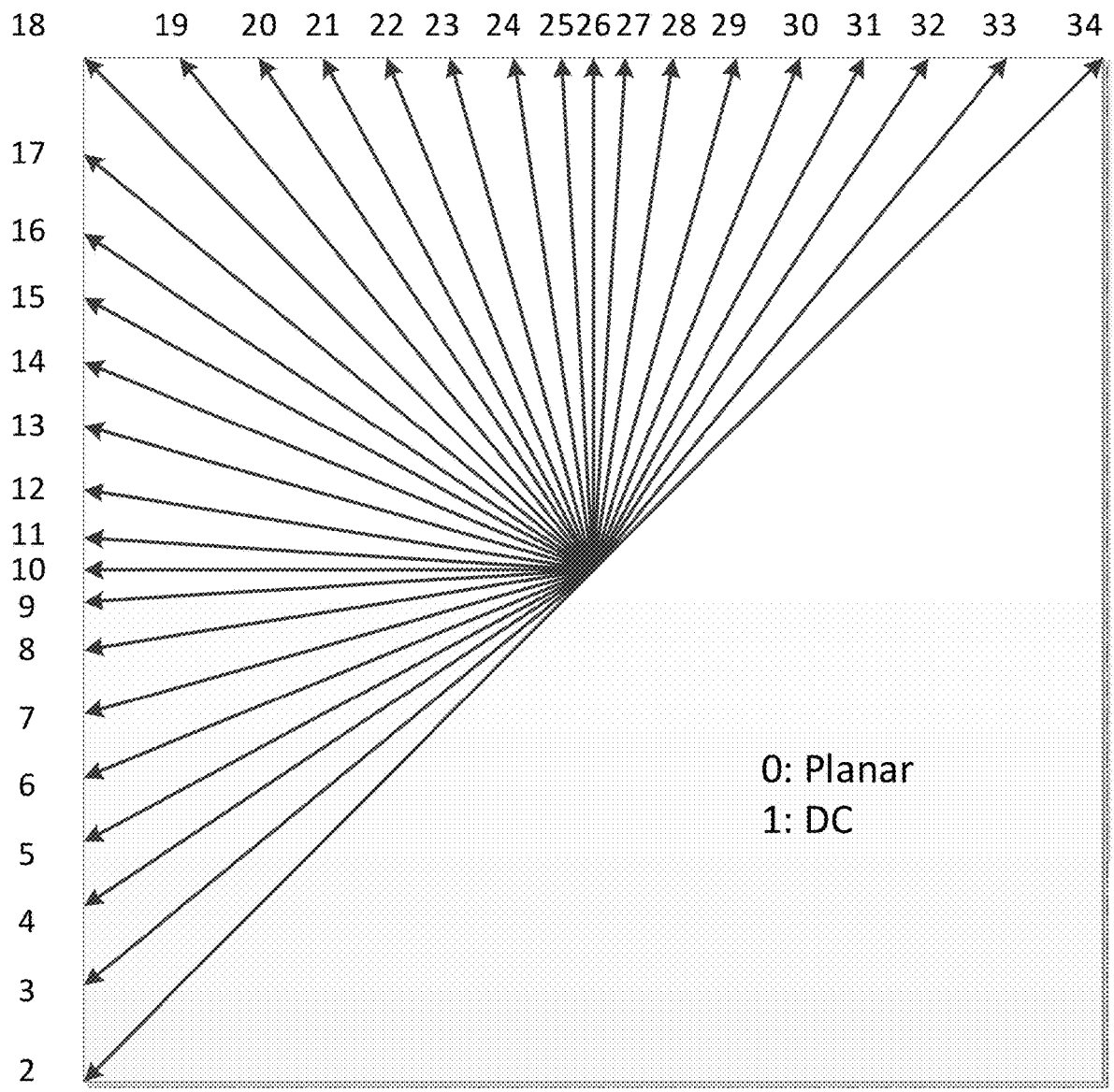
FIG. 5 is a conceptual diagram illustrating various prediction modes of HEVC.

Additionally or alternatively, video encoder 200 and video decoder 300 may perform techniques that are simpler than the iterative search techniques described in NET-E0027. In particular, video encoder 200 and video decoder 300 may check the cost (e.g., sum of absolute transform distance (SATD)) with one or more direct modes, and/or one or more modes from spatial neighboring luma/chroma blocks. These modes may be denoted as a first set of candidates. In one example, video encoder 200 and video decoder 300 may further check certain modes if these modes are not included in the first set of candidates, such as DC, planar, horizontal, and/or vertical modes. Alternatively, video encoder 200 and video decoder 300 may further check a second set of candidates, where the second set of candidates may include angular modes close to one or more angular modes in the first set of candidates (where "close" may be, e.g., within one unit of angle, e.g., as shown in FIG. 5 as discussed below).

In another example, video encoder 200 and video decoder 300 may check only a single set of candidates that depends on decoded information, including but not limited to any or all of the following: luma intra prediction mode, block size, transform type, and/or transform coefficients. For example, if the luma block is coded using DC or Planar mode, and the number of coded coefficients is small (e.g., no non-zero coefficients, or only a few non-zero coefficients), only DC or Planar mode can be considered as the candidate mode for DDM.

In some examples, when decoder-side derived direct mode is applied, the indication of chroma modes may be as follows. In one example, video encoder 200 and video decoder 300 may code a one bit flag that indicates whether the DDM is either CCLM or derived direction mode. In one example, video encoder 200 and video decoder 300 may code a one bit flag to indicate whether the DDM is either CCLM or derived direction mode or direct modes from luma blocks. In one example, video encoder 200 and video decoder 300 may construct the candidate list for chroma intra prediction mode list to only contain two modes: one is CCLM and the other is the derived direction mode.

In some examples, rather than using luma blocks to calculate a distortion cost, video encoder 200 and video decoder 300 may use a template that identifies neighboring chroma blocks to use for calculating the distortion cost. The template may be predefined, or video encoder 200 may construct the template and signal data representative of the template, e.g., in a video parameter set (VPS), sequence parameter set (SPS), picture parameter set (PPS), slice header, block header, or the like.

In some examples, video encoder 200 and video decoder 300 may derive chroma derived modes in units of sub-blocks. That is, video encoder 200 and video decoder 300 may divide a luma block into multiple sub-blocks. For each sub-block, the video coder (video encoder 200 or video decoder 300) may derive a sub-block DDM. The video coder may then apply this sub-block DDM to the co-located chroma sub-block to perform intra prediction. In one example, when deriving the DDM for each sub-block, the video coder only uses the reconstructed luma reference samples (located at the above/left neighborhood of the current block) to perform intra prediction for each candidate intra mode.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
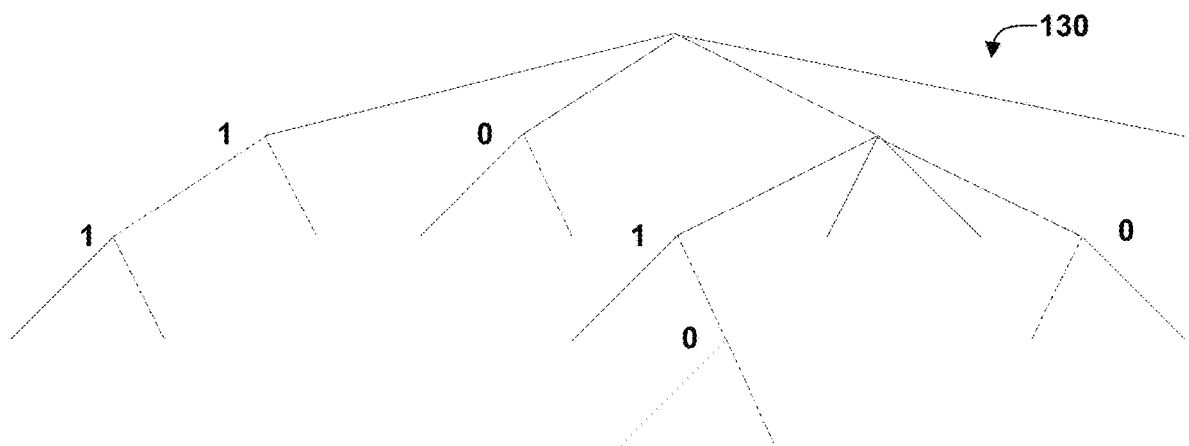
FIGS. 2A and 2B are conceptual diagrams illustrating an example quadtree binary tree (QTBT) structure, and a corresponding coding tree unit (CTU).
Figure 2B:
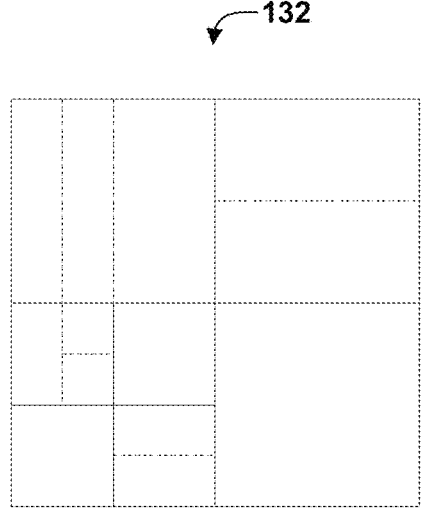

FIGS. 2A and 2B are a conceptual diagrams illustrating an example quadtree binary tree (QTBT) structure 130, and a corresponding coding tree unit (CTU) 132. J. An, Y.-W. Chen, K. Zhang, H. Huang, Y.-W. Huang, and S. Lei., "Block partitioning structure for next generation video coding," International Telecommunication Union, COM16-C966, September 2015, proposed a QTBT structure for future video coding standards beyond HEVC, similar to that of FIGS. 2A and 2B.

In the example of FIG. 2A, the solid lines represent quadtree splitting, and dotted lines indicate binary tree splitting. There are two binary tree splitting types: symmetric horizontal splitting and symmetric vertical splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU (or coding tree block (CTB)) may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

In addition, the QTBT block structure supports the feature that luma and chroma may have separate QTBT structures. Currently in JEM, for P and B slices, the luma and chroma CTUs in one CTU share the same QTBT structure. For I slice, the luma CTU is partitioned into CUs by a QTBT structure, and chroma CTUs are partitioned into chroma CUs by another QTBT structure. This means that, in JEM, a CU in an I slice includes a coding block of luma component or coding blocks of two chroma component, and a CU in P and B slice a CU includes coding blocks of all three color components.

In JEM, six chroma modes per PU are allowed. The DM mode indicates that a chroma PU utilizes the same prediction mode as a corresponding luma PU. For I slice, the QTBT structure for luma and chroma may be different. When DM mode is used in I slice, the luma prediction mode of the PU covering the top-left position is inherited.

FIGS. 3A and 3B are conceptual diagrams illustrating example QTBT structures for luma and chroma blocks. In particular, FIG. 3A depicts an example luma QTBT structure 134A, while FIG. 3B depicts an example chroma QTBT structure 134B. The left partition of the chroma CTU 138 (filled with grey) in FIG. 3B and its corresponding luma block 136 (filled with grey) with finer partitions in FIG. 3A are depicted. L(i) marked in each partition indicates the luma intra prediction mode index equal to i. In this case, when the left partition is coded with DM mode, it picks the LM mode from the top-left corresponding luma block, i.e., intra prediction mode index equal to 1 will be used to code/decode the left partition of the chroma block.

Table 1 below specifies the mode arrangement used in signaling the chroma mode of JEM. In order to remove possible redundancy in the signaling, arising when derived refers to one of the modes always present, angular (66 when there are 67 intra modes in total) mode (named "alternative mode") is used to substitute the duplicate mode, as shown in Table 1.

TABLE 1

Specification of Chroma Intra Prediction Modes and Associated Names

| | Chroma Intra prediction mode | Primary mode | Chroma intra alternative mode, if default mode is equal to the derived mode |
|---|---|---|---|
| Default modes | 0 | INTRA_PLANAR | INTRA_ANGULAR66 |
| | 1 | INTRA_ANGULAR50 | INTRA_ANGULAR66 |
| | 2 | INTRA_ANGULAR18 | INTRA_ANGULAR66 |
| | 3 | INTRA_DC | INTRA_ANGULAR66 |
| | 4 | LM | N/A |
| | 5 | Derived mode (DM) | N/A |

Figure 4:
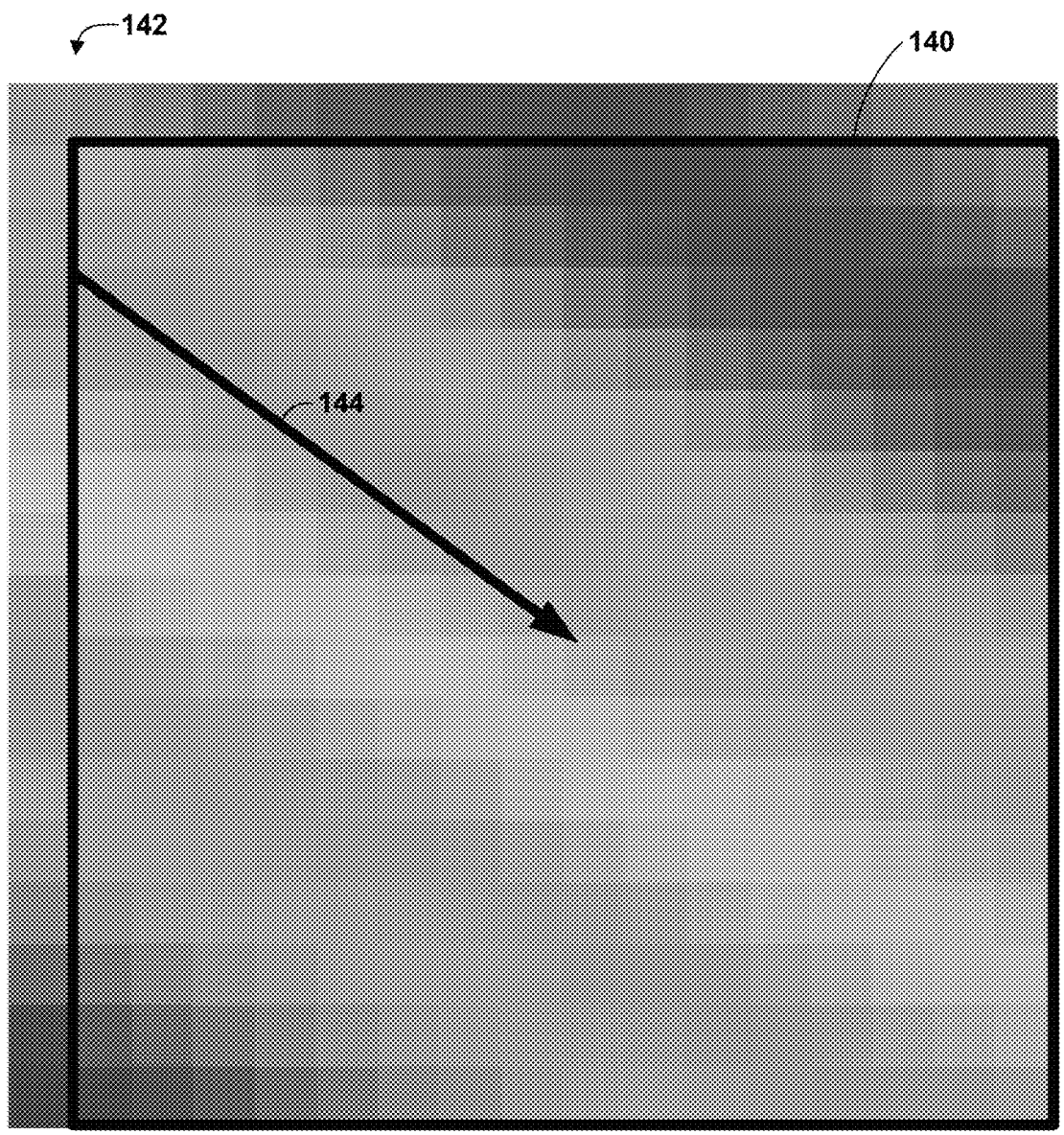
FIG. 4 is a conceptual diagram illustrating an example of intra-prediction for a 16×16 block.

FIG. 4 is a conceptual diagram illustrating an example of intra-prediction for a 16×16 block 140. A video coder, such as video encoder 200 or video decoder 300, generally performs intra-prediction on a block, such as block 140, using its spatially neighboring samples 142, which represent reconstructed image samples. To perform intra-prediction, the video coder may predict samples of block 140 using above-neighboring and/or left-neighboring samples of neighboring samples 142. For example, the video coder may use neighboring samples 142 to form predicted samples in a particular direction, such as along prediction direction 144.

HEVC, as one example, includes 35 intra-prediction modes, including 33 directional (or angular) modes and two non-directional modes: DC and planar mode. FIG. 5 is a conceptual diagram illustrating various prediction modes of HEVC. Table 2 specifies the various intra-prediction modes of HEVC.

TABLE 2

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Figure 6:
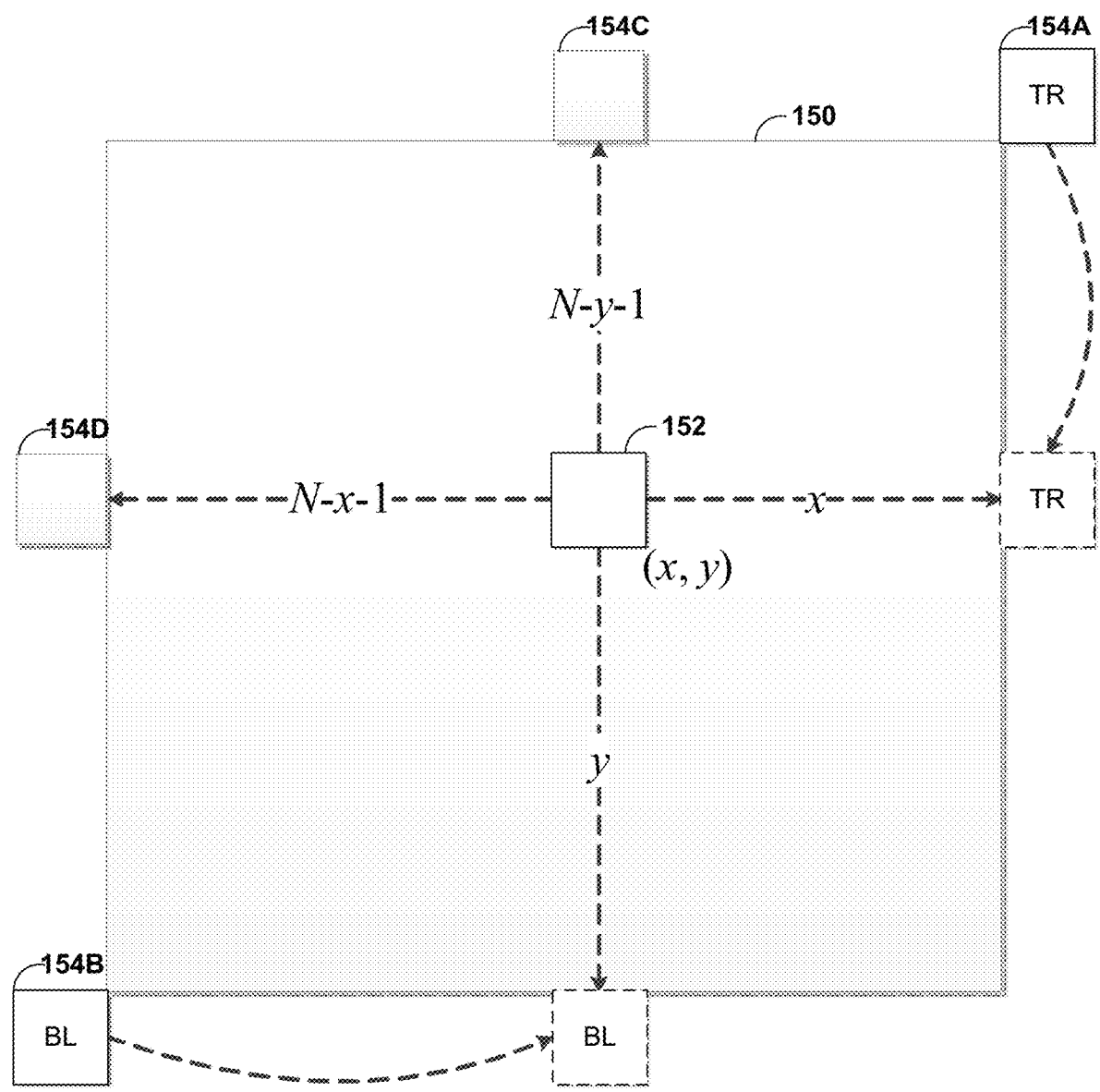
FIG. 6 is a conceptual diagram illustrating generation of a prediction block using planar mode.

FIG. 6 is a conceptual diagram illustrating generation of a prediction block using planar mode. Planar mode is typically the most frequently used intra-prediction mode for coding video data. To perform planar prediction for an N×N block 150, for each sample $p_{xy}$ located at (x, y) (i.e., sample 152), the video coder calculates a prediction value using four specific neighboring reconstructed samples, i.e., reference samples 154A, 154B, 154C, and 154D (reference samples 154), using a bilinear filter. The four reference samples 154 include the top-right reconstructed sample TR 154A, the bottom-left reconstructed sample BL 154B, the reconstructed sample 154C located at the same column $(r_{x,-1})$ of the current sample denoted by T, and the sample 154D at the same row $(r_{-1,y})$ of the current sample denoted by L. The planar mode can be formulated as:

$$p_{xy} = (N-x-1) \cdot L + (N-y-1) \cdot T + x \cdot TR + y \cdot BL \quad (1)$$

For DC mode, the video coder fills the prediction block with the average value of the neighboring reconstructed samples. Generally, both Planar and DC modes are applied for modeling smoothly varying and constant image regions.

Figure 7:
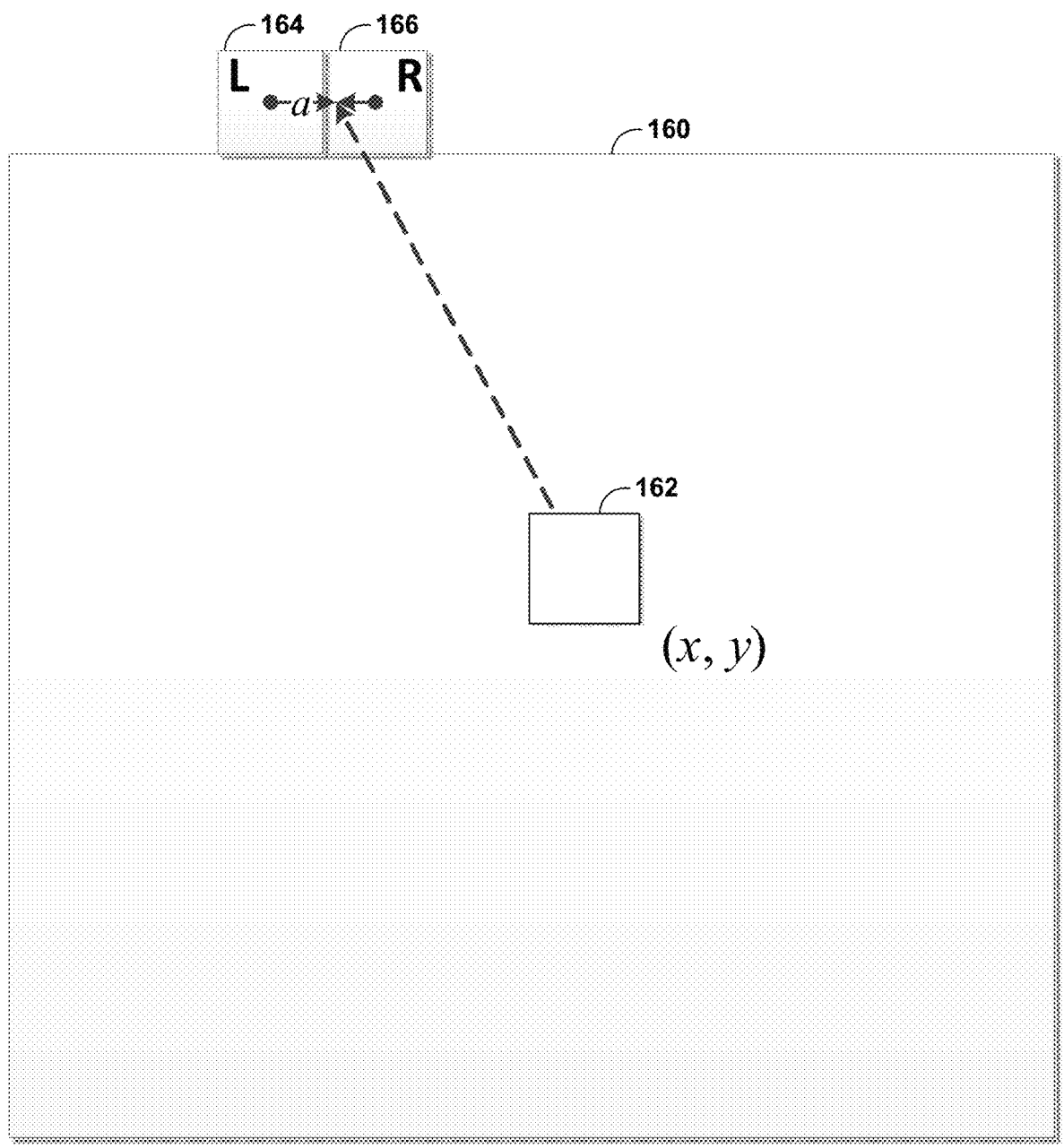
FIG. 7 is a conceptual diagram illustrating an example of predicting a block using an angular intra-prediction mode.

FIG. 7 is a conceptual diagram illustrating an example of predicting a block 160 using an angular intra-prediction mode. For angular intra-prediction modes (which, in HEVC, include 33 different prediction directions), the intra-prediction process is described as follows. For each given angular intra-prediction, the intra prediction direction (or angle) can be identified accordingly. For example, according to FIG. 5, intra mode 18 corresponds to a pure horizontal prediction direction, and intra mode 26 corresponds to a pure vertical prediction direction.

Given a specific intra prediction direction, for each sample of the prediction block, the video coder projects the coordinate (x, y) of the sample to the row/column of neighboring reconstructed samples along the prediction direction. For example, as shown in FIG. 7, sample 162 is predicted using reference samples 164, 166. Suppose (x,y) is projected to the fractional position α between two neighboring reconstructed samples L 164 and R 166. Then the video coder calculates the prediction value for (x, y) using a two-tap bi-linear interpolation filter, formulated as follows in HEVC:

$$p_{xy} = (1-\alpha) \cdot L + \alpha \cdot R \quad (2)$$

To avoid floating point operations, in HEVC, the above calculation is actually approximated using integer arithmetic as:

$$p_{xy} = ((32-a) \cdot L + a \cdot R + 16) >> 5 \quad (3)$$

where a is an integer equal to 32*α.

Quite often, coding structures in the chroma signal follow those of the co-located luma signal. Taking advantage of this behavior, HEVC introduced a mechanism to indicate the cases when a chroma block (or prediction unit (PU) in HEVC) utilizes the same prediction mode as the corresponding luma block (or PU). Table 3 below specifies the mode arrangement used in signaling the chroma mode in conventional HEVC. In the case that derived mode is indicated for a PU of HEVC, the prediction is performed by using the corresponding luma PU mode. In order to remove the possible redundancy in the signaling arising when the derived mode refers to one of the modes always present, angular (34) mode (named alternative mode) is used to substitute the duplicate mode as shown in Table 3, in HEVC.

TABLE 3

Specification of Chroma Intra Prediction Modes and Associated Names

| | Chroma Intra prediction mode | Primary mode | Chroma intra Alternative mode, if the default mode is equal to the derived mode |
|---|---|---|---|
| Default modes | 0 | INTRA_PLANAR | INTRA_ANGULAR34 |
| | 1 | INTRA_ANGULAR26 | INTRA_ANGULAR34 |
| | 2 | INTRA_ANGULAR10 | INTRA_ANGULAR34 |
| | 3 | INTRA_DC | INTRA_ANGULAR34 |
| | 4 | Derived mode (DM) | N/A |

In chroma mode coding according to HEVC, a one-bit (1-b) syntax element (0) is assigned to the most often occurring derived mode, while three-bit (3-b) syntax elements (100, 101, 110, 111) are assigned to the remaining four modes. Only the first bin (or bit) is coded with one context model, and the remaining two bins (if needed) are bypass coded.

JEM has extended the 33 angular modes of HEVC to 65 angular modes, plus DC and planar mode. JEM also includes techniques for signaling intra-prediction modes using six most probable modes (MPMs) of an MPM candidate list, as discussed in EE5: Enhanced Cross-component Linear Model Intra-prediction, K. Zhang, J. Chen, L. Zhang, M. Karczewicz, "EE5: Enhanced Cross-component Linear Model Intra-prediction," JVET-E0077. According to JEM, a video coder first codes one flag (MPM flag) for a block to indicate whether the intra-prediction mode for the block is from the MPM candidate list. If the intra-prediction mode is from the MPM candidate list, the video coder then codes an index into the MPM candidate list that identifies the intra-prediction mode used to predict the block in the MPM candidate list. If the intra-prediction mode is not from the MPM candidate list, the video coder codes an index into the remaining intra-prediction modes that identifies the intra-prediction mode used to predict the block from the remaining intra-prediction modes.

JEM also includes techniques for performing adaptive multiple core transforms. In addition to DCT-II and 4×4 DST-VII, which have been employed in HEVC, an Adaptive Multiple Transform (AMT) scheme is used in JEM for residual coding for both inter and intra coded blocks. According to the AMT scheme, a video coder uses multiple selected transforms from the DCT and DST families, other than the transforms of HEVC. The newly introduced transform matrices are DST-VII, DCT-VIII, DST-I and DCT-V.

For intra residue coding, due to the different residual statistics of different intra prediction modes, JEM describes a mode-dependent transform candidate selection process. JEM defines three transform sub-sets, as shown in Table 4, and the video coder selects the transform subset based on the intra prediction mode, as specified in Table 5.

TABLE 4

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 5

Selected (H)orizontal and (V)ertical transform sets for each intra-prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

With the sub-set conception, the video coder identifies a transform subset using the intra-prediction mode of a coding unit (CU) with the CU-level AMT flag being equal to 1. After that, for each of the horizontal and vertical transform, the video coder selects one of the two transform candidates in the identified transform subset based on data that is explicitly signaled with lag. For inter-prediction residual, however, only one transform set, which includes DST-VII and DCT-VIII, is used for all inter modes and for both horizontal and vertical transforms.

Figure 8:
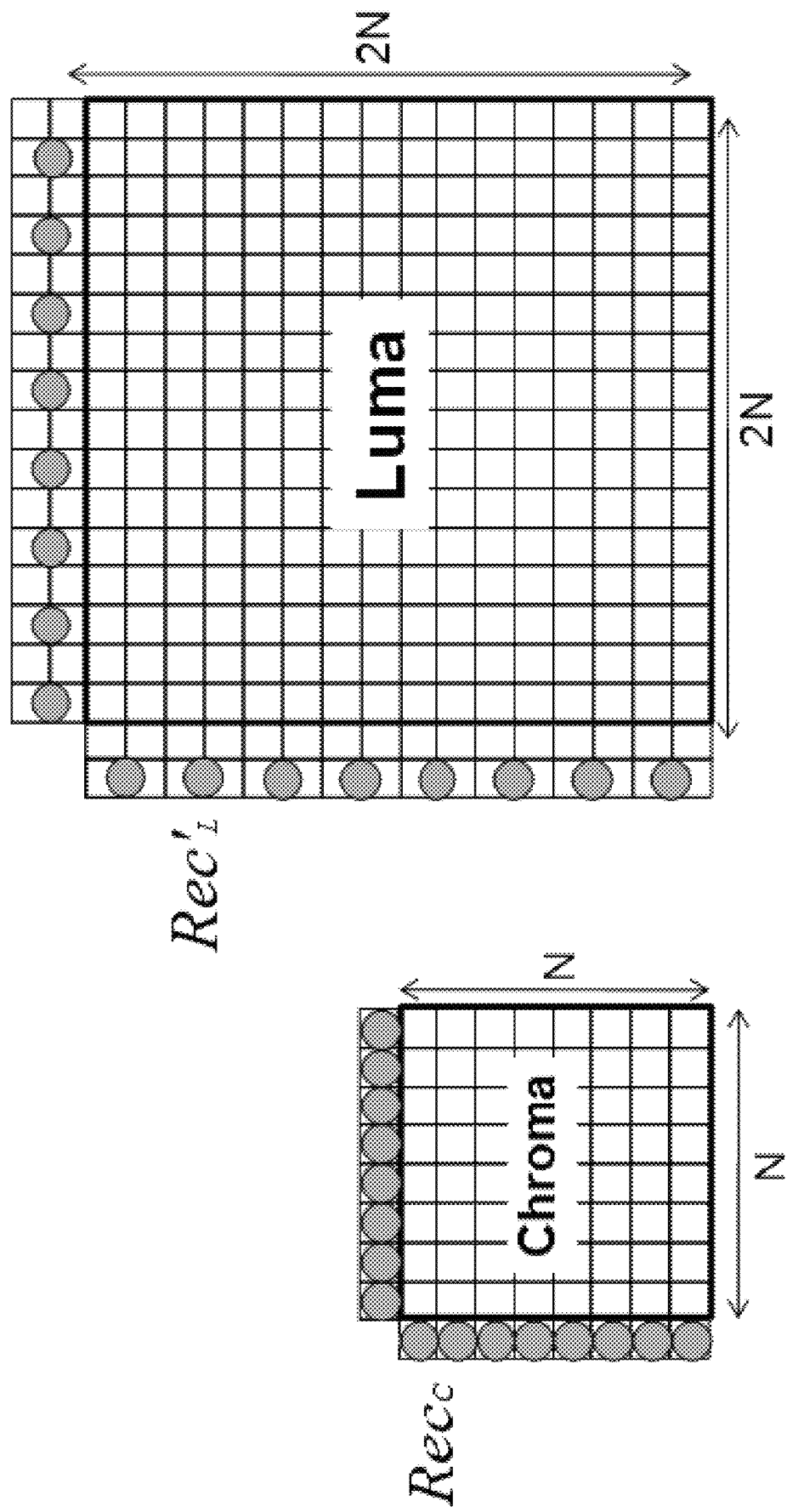
FIG. 8 is a conceptual diagram illustrating example sets of reference samples used for linear model prediction mode for video coding.

FIG. 8 is a conceptual diagram illustrating example sets of reference samples used for linear model prediction mode for video coding. JEM describes a linear model (LM) prediction mode for video coding. Although the cross-complement redundancy is significantly reduced in YCbCr color space, correlation between three color components still exists. Various methods have been studied to improve the video coding performance by further reduce the correlation.

In 4:2:0 chroma video coding, a method named Linear Model (LM) prediction mode has been well studied during development of HEVC standard. With LM prediction mode, the chroma samples are predicted based on downsampled reconstructed luma samples of the same block by using a linear model as follows:

$$\text{pred}_C(i,j) = \alpha \cdot \text{rec}_L(i,j) + \beta \quad (4)$$

where $\text{pred}_C(i, j)$ represents the prediction of chroma samples in a block and $\text{rec}_L(i, j)$ represents the downsampled reconstructed luma samples of the same block. Parameters $\alpha$ and $\beta$ are derived from causal reconstructed samples around the current block, and one example for selected reference samples is depicted in FIG. 8. Denote the chroma block size by N×N, then both i and j are within the range [0, N).

Parameters $\alpha$ and $\beta$ in equation (4) are derived by minimizing regression error between the neighboring reconstructed luma and chroma samples around the current block.

$$E(\alpha, \beta) = \sum_i (y_i - (\alpha \cdot x_i + \beta))^2 \quad (5)$$

And the parameters $\alpha$ and $\beta$ are solved as follows $$\alpha = \frac{I \Sigma x_i \cdot y_i - \Sigma x_i \cdot \Sigma y_i}{I \Sigma x_i \cdot x_i - \Sigma x_i \cdot \Sigma x_i} \quad (6)$$

$$\beta = (\Sigma y_i - \alpha \cdot \Sigma x_i)/I \quad (7)$$

where $x_i$ is a downsampled reconstructed Luma reference sample, $y_i$ represents reconstructed Chroma reference samples, and I is an amount of the reference samples. For a target N×N chroma block, when both left and above causal samples are available, total involved samples number I is equal to 2N; when only left or above causal samples are available, total involved samples number I is equal to N.

In summary, when LM prediction mode is applied, the following steps are invoked in order:

a) Downsampling the neighboring luma samples b) Derive the linear parameters (i.e., $\alpha$ and $\beta$)

c) Downsampling the current luma block and derive the prediction from the downsampled luma block and linear parameters To further improve the coding efficiency, a video coder may use a downsampling filter of (1, 2, 1) and (1, 1) to derive neighboring samples $x_i$ and downsampled luma samples $rec_L(1, j)$ within the corresponding luma block.

In JEM, the LM prediction mode is extended to the prediction between two chroma components, i.e., Cr component is predicted from Cb component. Instead of using the reconstructed sample signal, the cross component prediction is applied in residual domain. This is implemented by adding a weighted reconstructed Cb residual to the original Cr intra prediction to form the final Cr prediction:

$$\text{pred*}_{Cr}(i,j) = \text{pred}_{Cr}(i,j) + \alpha \cdot \text{resi}_{Cb}'(i,j) \quad (8)$$

The scaling factor $\alpha$ is derived in as in LM mode. The only difference is an addition of a regression cost relative to a default $\alpha$ value in the error function so that derived scaling factor is biased towards the default value (−0.5).

In JEM, LM prediction mode is added as one additional chroma intra prediction mode. At encoder side, one more RD cost check for chroma component is added for selecting the chroma intra prediction mode. The prediction from luma to chroma is called cross-component linear mode (CCLM).

JEM describes the following for entropy coding of chroma prediction modes. In chroma mode coding, a 1-b syntax element (0) is assigned to the most often occurring derived mode, two bins (10) are assigned to LM mode, and 4-b syntax elements (1100, 1101, 1110, 1111) are assigned to the remaining four modes. The video coder codes the first two bins with one context model, and the remaining two bins (if needed) using bypass coding. Table 6 below indicates the bin string for each chroma mode, according to JEM.

TABLE 6

Bin string for each chroma mode

| Chroma Intra prediction mode | Bin string | Note |
|---|---|---|
| 0 | 1 1 00 | The first two bins are each coded with on context model. |
| 1 | 1 1 01 | |
| 2 | 1 1 10 | |
| 3 | 1 1 11 | |
| 4 | 1 0 | |
| 5 | 0 | |

Two proposals related to chroma coding were adopted during the 5$^{th}$ JVET meeting held from Jan. 12, 2017. The first related to improved CCLM modes, and the second related to multiple derived modes.

With respect to the improved CCLM modes, multiple linear models (MMLM) mode was adopted. According to this mode, a video coder groups samples of a block into multiple sets. The video coder calculates a threshold (Threshold) value as the average value of the neighboring reconstructed Luma samples. A neighboring sample with $\text{Rec}'_L[x,y] \leq \text{Threshold}$ is classified into group 1, while a neighboring sample with $\text{Rec}'_L[x,y] > \text{Threshold}$ is classified into group 2 and two CCLM models are used for 2 groups of samples. These techniques are described in JVET-E0077.

With respect to multiple derived modes, the modes include cross-component linear model mode, multiple intra prediction modes derived from co-located luma coding blocks, and modes from spatial neighbors. The modes from spatial neighbors include five chroma prediction modes from left, above, below-left, above-right, and above-left spatial neighboring blocks of merge mode; planar and DC modes; derived modes are added, those intra modes are obtained by adding −1 or +1 to the angular modes which are already included into the list; default modes are added in the order of: Vertical (Mode 18), Horizontal (Mode 50), Mode 2, Mode 34, Mode 66, Mode 10, Mode 26; and then if any of the four default modes (Planar, Horizontal, Vertical and DC modes) is not included in the list, the missing default modes are used to replace the last one or more candidates. These techniques are described in L. Zhang, W.-J. Chien, J. Chen, X. Zhao, M. Karczewicz, "Multiple Direct Modes for chroma intra coding", JVET-E0062.

Yu Han, Jicheng An, Jianhua Zheng, "Decoder-Side Direct Mode Prediction," JVET-E0027, describes a decoder-side derived direct mode (DDM) technique for JEM. The flow of the proposed DDM techniques is described below. Initially, for a current chroma block, a video coder downsamples a co-located reconstructed luma block using a 2D 3×2 ({1 2 1} {1 2 1}) filter. JVET-E0027 proposed modifications to the intra-prediction techniques described in V. Seregin, X. Zhao, A. Said, M. Karczewicz, "Neighbor based intra most probable modes list derivation," JVET-00055, Geneva, May 2016.

Figure 9:
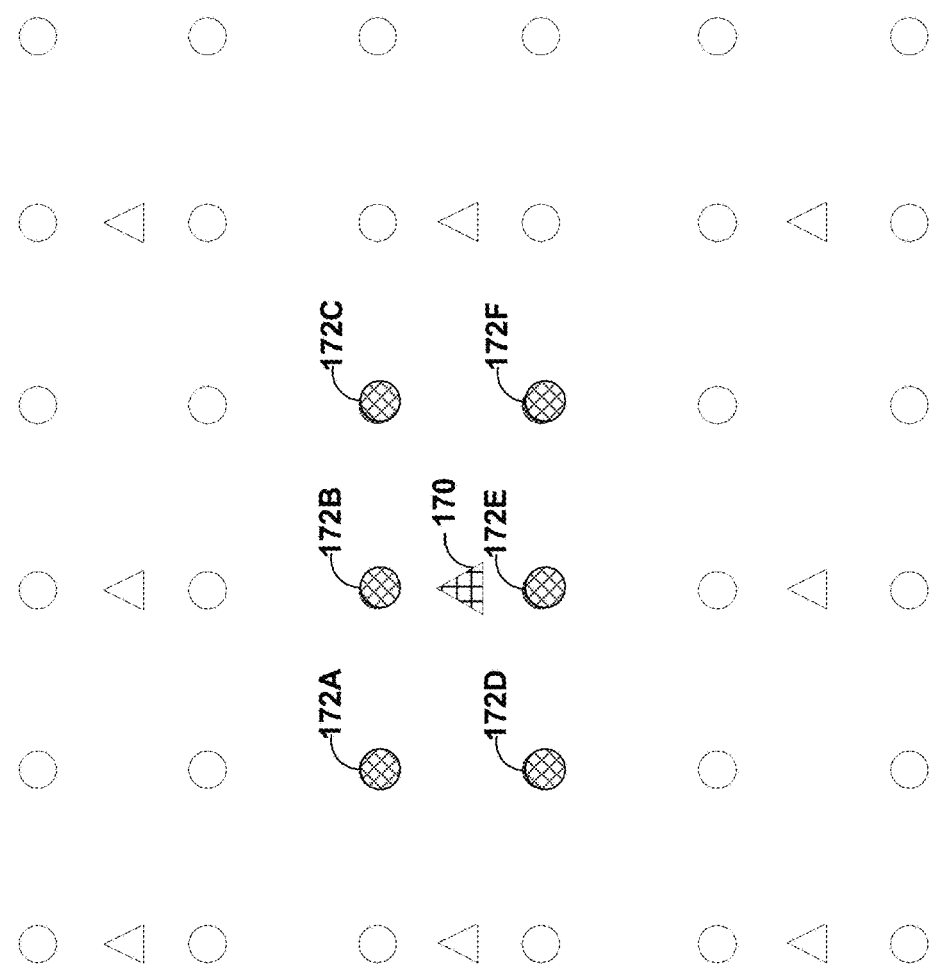
FIG. 9 is a conceptual diagram illustrating an example process for downsampling luma blocks according to decoder-side derived mode (DDM) techniques.

FIG. 9 is a conceptual diagram illustrating an example process for downsampling luma blocks according to the DDM techniques. To produce a luma value corresponding to chroma position 170, a video coder applies the ({1 2 1} {1 2 1}) filter to luma samples at luma positions 172A, 172B, 172C, 172D, 172E, and 172F, adds these values together, and divides by eight. Thus, the video coder multiplies the values of luma samples 172B and 172E by two, and adds these values to the values of luma samples 172A, 172C, 172D, and 172F, then divides this total by eight to produce the downsampled luma value at chroma position 170. By downsampling the reconstructed luma block in this manner, the video coder reduces searching complexity.

The video coder then calculates the sum of absolute transform difference (SATD) between a prediction block and the reconstruction of the down-sampled luma block, for each of the intra modes to be tested as DDM. The video coder selects the intra mode that yields the minimum SATD the best mode, i.e., DDM.

The video coder then modifies the intra chroma prediction mode list by adding the DDM mode into the intra chroma prediction mode list, which includes one cross-component linear model (CCLM) mode, one proposed DDM mode, one DM mode derived from the co-located luma block, and three default modes (planar, vertical, and horizontal; if one of these is identical to the DM mode, it is replaced by the DC mode). The binarization for the syntax element intra chroma prediction mode is specified in Table 7. Four context models are used to code the intra chroma prediction mode.

TABLE 7

Binarization for intra chroma prediction mode

| Intra chroma prediction mode | Bin string |
|---|---|
| CCLM | 0 |
| DDM | 10 |
| DM | 110 |
| 0 | 1110 |
| 1 | 11110 |
| 2 | 11111 |

Considering the trade-off between complexity and performance, an iterative search algorithm is used for DDM prediction, as proposed in JVET-E0027. Firstly, according to JVET-E0027, the initial mode candidate list consists of planar, DC, and every 4-th mode of the 65 angular intra directions. Then, the SATD is calculated for all the candidate intra modes, and the one that minimizes the SATD is selected as the starting intra mode for the next search. If the selected intra mode is planar or DC, it is set to DDM mode, and the searching process finishes. Otherwise, JVET-E0027 proposes searching the two neighboring modes (with interval 2) of the starting intra mode. The best mode is used as the starting intra mode for the next search. In the last search, the two nearest neighboring modes (with interval 1) of the starting intra mode are checked. Finally, set DDM mode to the intra mode which minimizes the SATD.

Figure 10:
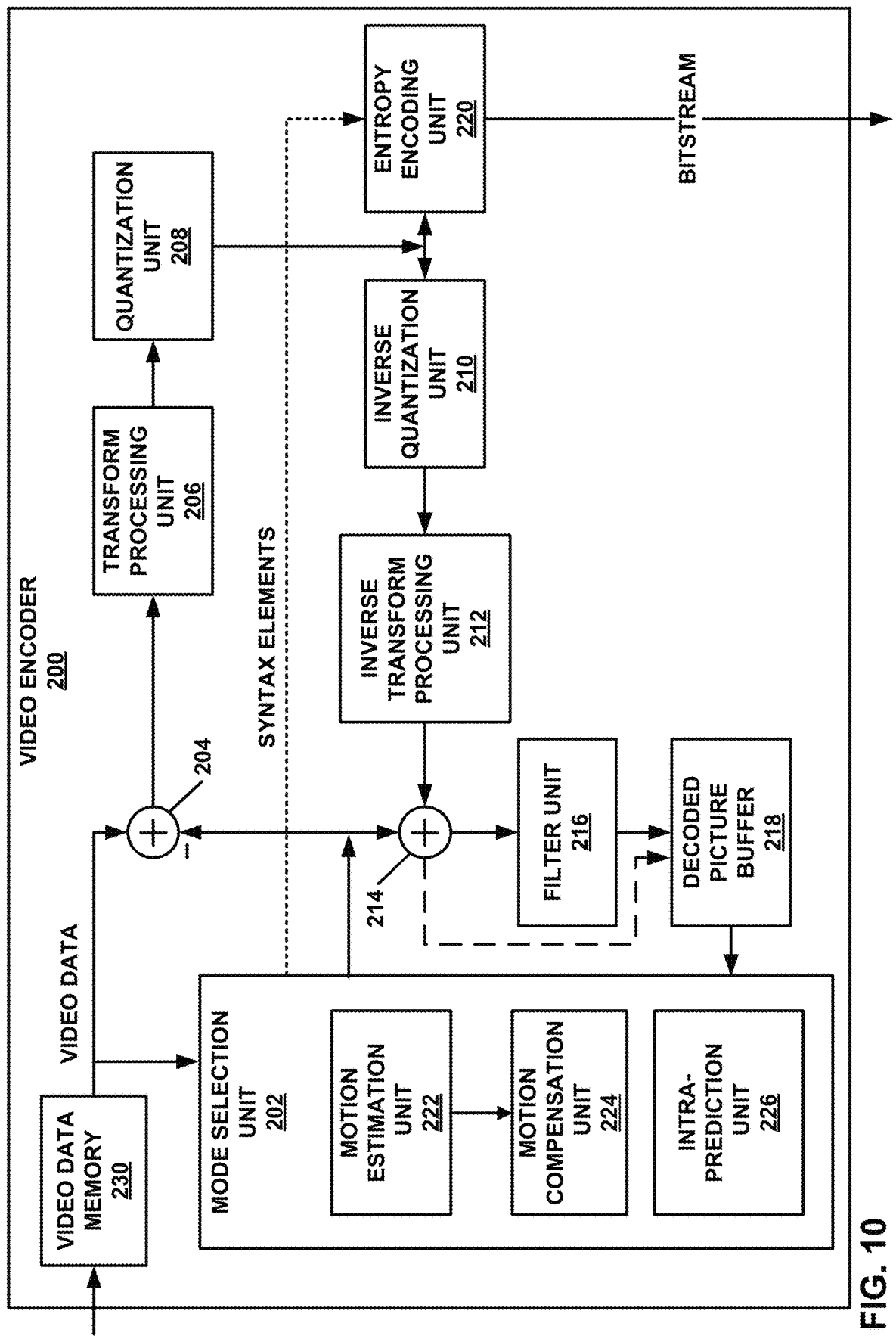
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for angular modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When mode selection unit 202 determines to perform intra-prediction for a chroma block, mode selection unit 202 may avoid actually signaling an indication of the intra-prediction mode for the chroma block. Instead, it may be presumed that a video decoder, such as video decoder 300, will derive the intra-prediction mode using other information of the bitstream. Moreover, mode selection unit 202 may select the intra-prediction mode using the same information, in order to ensure that the same intra-prediction mode will be selected by the decoder.

According to the techniques of this disclosure, to derive an intra-prediction mode for a chroma block, mode selection unit 202 (or intra-prediction unit 226 thereof) may construct an intra-prediction candidate list for the chroma block. The intra-prediction candidate list may include candidate intra-prediction modes for the chroma block. Mode selection unit 202 may then calculate sum of absolute transform difference (SATD) values for each of the candidate intra-prediction modes in the intra-prediction candidate list for the chroma block. Mode selection unit 202 may then provide an indication of the intra-prediction mode having the lowest SATD value to intra-prediction unit 226 to cause intra-prediction unit 226 to generate a prediction block for the chroma block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter-prediction. Video encoder 20 and video decoder 30 may also support asymmetric partitioning for PU sizes of 2N×nU, 2N×nD, nL×2N, and nR×2N for inter-prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 216 may quantize the transform coefficients in a transform coefficient block, to produce a quantized transform coefficient block. Quantization unit 216 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. As illustrated by dashed lines, operations of filter unit 216 may be skipped in some examples.

Video encoder 200 stores reconstructed blocks in DPB 218. For instance, in examples where operations of filter unit 224 are not needed, reconstruction unit 214 may store reconstructed blocks to DPB 218. In examples where operations of filter unit 224 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 represents an example of a device configured to encode video data including a memory configured to store video data, and one or more processing units implemented in circuitry and configured to construct an intra-prediction candidate list for a current chroma block of the video data indicating candidate intra-prediction modes for the current chroma block, wherein the intra-prediction candidate list indicates a subset of allowed luminance (luma) candidate intra-prediction modes, determine cost values for each of the candidate intra-prediction modes indicated by the intra-prediction candidate list for the current chroma block; and generate a prediction block for the current chroma block using one of the candidate intra-prediction modes indicated by the intra-prediction candidate list according to the cost values.

Figure 11:
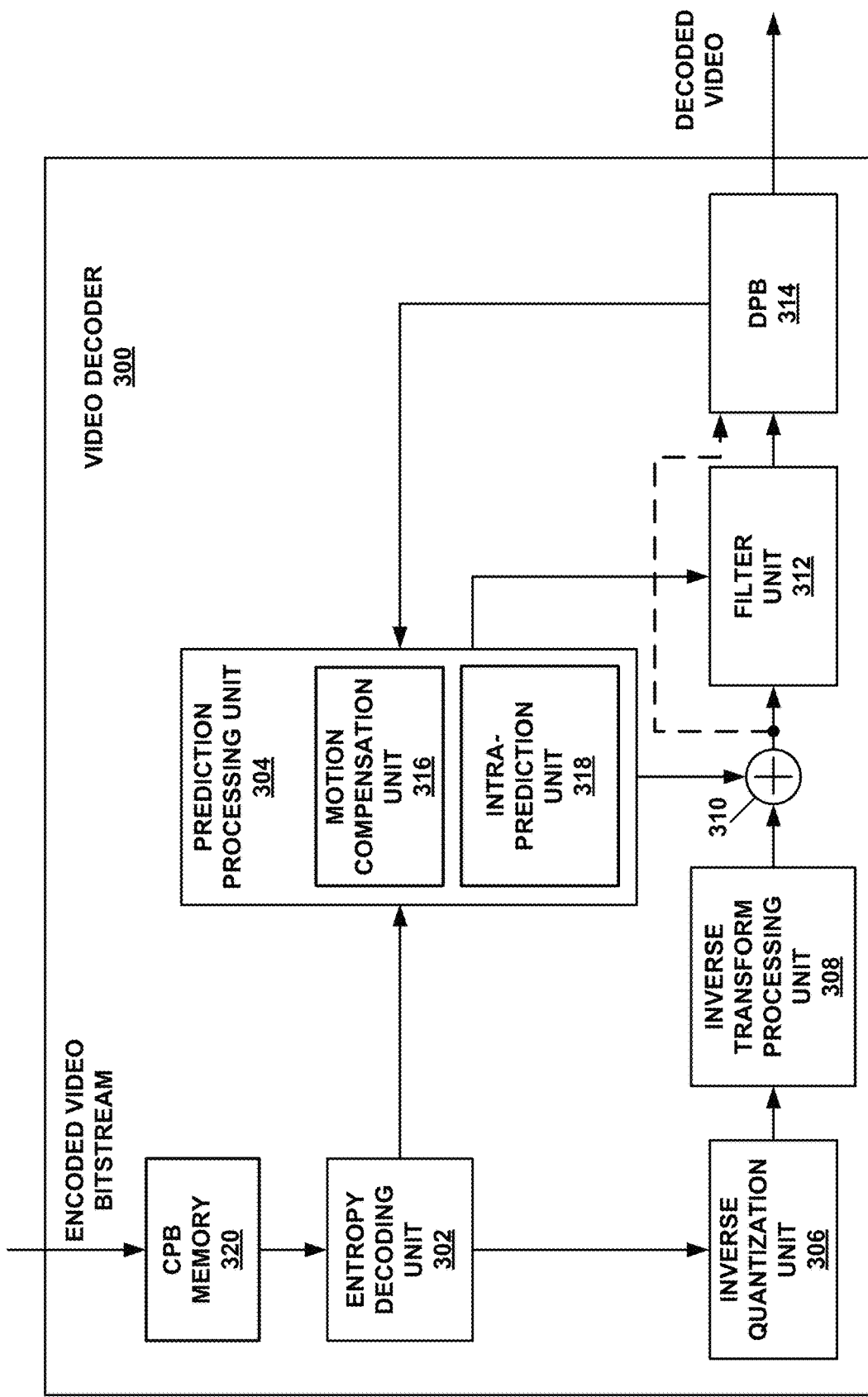
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

When prediction processing unit 304 determines that a chroma block is intra-predicted, entropy decoding unit 302 may not decode an indication of the intra-prediction mode for the chroma block. Instead, prediction processing unit 304 may derive the intra-prediction mode using other information of the bitstream.

According to the techniques of this disclosure, to derive an intra-prediction mode for a chroma block, prediction processing unit 304 (or intra-prediction unit 318 thereof) may construct an intra-prediction candidate list for the chroma block. The intra-prediction candidate list may include candidate intra-prediction modes for the chroma block. Prediction processing unit 304 may then calculate sum of absolute transform difference (SATD) values for each of the candidate intra-prediction modes in the intra-prediction candidate list for the chroma block. Prediction processing unit 304 may then provide an indication of the intra-prediction mode having the lowest SATD value to intra-prediction unit 318 to cause intra-prediction unit 318 to generate a prediction block for the chroma block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. As illustrated by dashed lines, operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to construct an intra-prediction candidate list for a current chroma block of the video data indicating candidate intra-prediction modes for the current chroma block, wherein the intra-prediction candidate list indicates a subset of allowed luminance (luma) candidate intra-prediction modes, determine cost values for each of the candidate intra-prediction modes indicated by the intra-prediction candidate list for the current chroma block; and generate a prediction block for the current chroma block using one of the candidate intra-prediction modes indicated by the intra-prediction candidate list according to the cost values.

Figure 12:
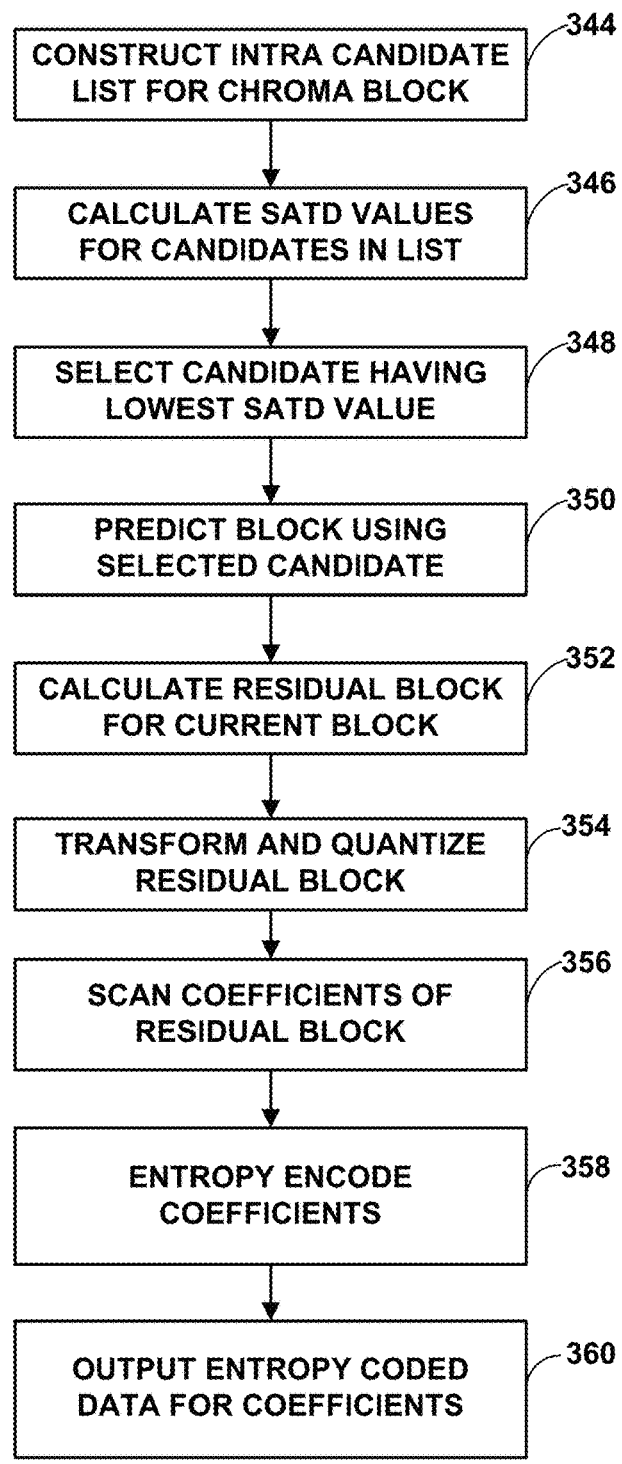
FIG. 12 is a flowchart illustrating an example method of encoding a block of video data according to the techniques of this disclosure.

FIG. 12 is a flowchart illustrating an example method for encoding a current block. The current block may comprise a current CU. Although described with respect to video encoder 200 (FIGS. 1 and 10), it should be understood that other devices may be configured to perform a method similar to that of FIG. 12.

In this example, video encoder 200 initially constructs an intra-prediction candidate list for a current chroma block (344). The intra-prediction candidate list indicates (e.g., includes) candidate intra-prediction modes for the chroma block. In some examples, video encoder 200 may add one or more default intra-prediction modes to the intra-prediction candidate list, where the default intra-prediction modes may include DC mode, planar mode, horizontal mode, and vertical mode. In some examples, to construct the intra-prediction candidate list, video encoder 200 may add a first set of one or more angular intra-prediction modes to the intra-prediction candidate list corresponding to angular intra-prediction modes of one or more neighboring blocks to the current chroma block or a luma block co-located with the current chroma block, and then add a second set of one or more angular intra-prediction modes to the intra-prediction candidate list, each of the second set of one or more angular intra-prediction modes having an angle close to an angle of at least one of the intra-prediction modes of the first set (where close may be, e.g., within one unit of angle, as shown in FIG. 5). In some examples, video encoder 200 may add at least one direct intra-prediction mode to the intra-prediction candidate list, and add an intra-prediction mode of a neighboring block to the current chroma block to the intra-prediction candidate list.

Video encoder 200 may then calculate cost values, e.g., sum of absolute transform difference (SATD values) for the intra-prediction mode candidates in the candidate list (346). For example, video encoder 200 may downsample a reconstructed luma block co-located with the current chroma block. In some examples, video encoder 200 may select a downsampling ratio for the luma block from a plurality of different available downsampling ratios, e.g., as a function of a size of the luma block or of the chroma block. In some examples, video encoder 200 may calculate the SATD values relative to a reference block generated from one or more neighboring chroma blocks indicated by a template, rather than from the downsampled luma block. Then, for each candidate intra-prediction mode in the intra-prediction candidate list, video encoder 200 may generate a prediction block using the candidate intra-prediction mode corresponding to the downsampled reconstructed luma block, and calculate the SATD value for the candidate intra-prediction mode between the generated prediction block and the downsampled reconstructed luma block or the generated reference block.

Video encoder 200 may then select the intra-prediction candidate having the lowest SATD value as the intra-prediction mode for the current chroma block (348). Video encoder 200 then predicts the current chroma block (350). For example, video encoder 200 may form a prediction block for the current block using the selected intra-prediction mode. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In this manner, the method of FIG. 12 represents an example of a method of encoding a chroma block of video data, including constructing an intra-prediction candidate list for a current chroma block of video data indicating candidate intra-prediction modes for the current chroma block, wherein the intra-prediction candidate list indicates a subset of allowed luminance (luma) candidate intra-prediction modes; determining cost values for each of the candidate intra-prediction modes indicated by the intra-prediction candidate list for the current chroma block; and generating a prediction block for the current chroma block using one of the candidate intra-prediction modes indicated by the intra-prediction candidate list according to the cost values. Video encoder 200 may also use the generated prediction block to decode and reconstruct the current chroma block for subsequent prediction of other blocks in the same picture, and therefore, this method may also be described as a method of decoding video data performed by video encoder 200.

Figure 13:
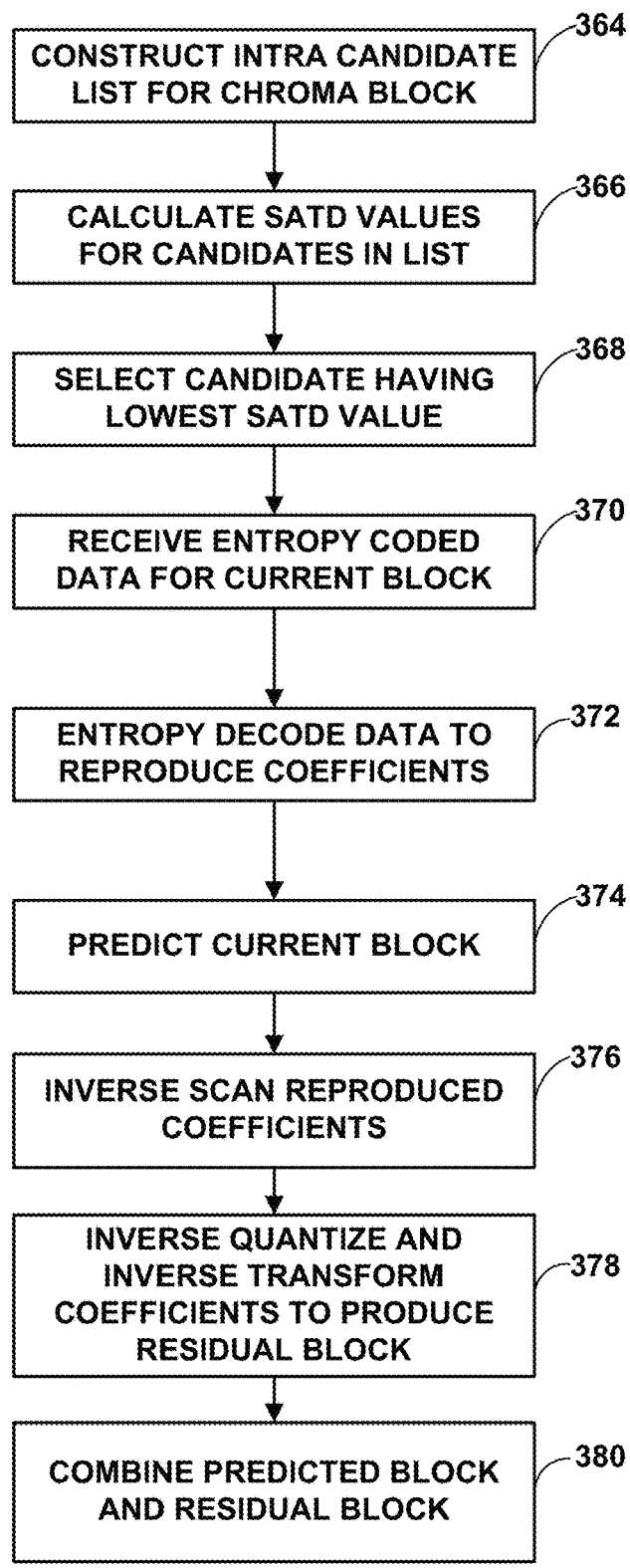
FIG. 13 is a flowchart illustrating an example method of decoding a block of video data according to the techniques of this disclosure.

FIG. 13 is a flowchart illustrating an example method for decoding a current block of video data. The current block may comprise a current CU. Although described with respect to video decoder 300 (FIGS. 1 and 11), it should be understood that other devices may be configured to perform a method similar to that of FIG. 13.

In this example, video decoder 300 initially constructs an intra-prediction candidate list for a current chroma block (364). The intra-prediction candidate list indicates (e.g., includes) candidate intra-prediction modes for the chroma block. In some examples, video decoder 300 may add one or more default intra-prediction modes to the intra-prediction candidate list, where the default intra-prediction modes may include DC mode, planar mode, horizontal mode, and vertical mode. In some examples, to construct the intra-prediction candidate list, video decoder 300 may add a first set of one or more angular intra-prediction modes to the intra-prediction candidate list corresponding to angular intra-prediction modes of one or more neighboring blocks to the current chroma block or a luma block co-located with the current chroma block, and then add a second set of one or more angular intra-prediction modes to the intra-prediction candidate list, each of the second set of one or more angular intra-prediction modes having an angle close to an angle of at least one of the intra-prediction modes of the first set (where close may be, e.g., within one unit of angle, as shown in FIG. 5). In some examples, video decoder 300 may add at least one direct intra-prediction mode to the intra-prediction candidate list, and add an intra-prediction mode of a neighboring block to the current chroma block to the intra-prediction candidate list.

Video decoder 300 may then calculate cost values, e.g., sum of absolute transform difference (SATD values) for the intra-prediction mode candidates in the candidate list (366). For example, video decoder 300 may downsample a reconstructed luma block co-located with the current chroma block. In some examples, video decoder 300 may select a downsampling ratio for the luma block from a plurality of different available downsampling ratios, e.g., as a function of a size of the luma block or of the chroma block. In some examples, video decoder 300 may calculate the SATD values relative to a reference block generated from one or more neighboring chroma blocks indicated by a template, rather than from the downsampled luma block. Then, for each candidate intra-prediction mode in the intra-prediction candidate list, video decoder 300 may generate a prediction block using the candidate intra-prediction mode corresponding to the downsampled reconstructed luma block, and calculate the SATD value for the candidate intra-prediction mode between the generated prediction block and the downsampled reconstructed luma block or the generated reference block.

Video decoder 300 may then select the intra-prediction candidate having the lowest SATD value as the intra-prediction mode for the current chroma block (368). Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 13 represents an example of a method of decoding a chroma block of video data, including constructing an intra-prediction candidate list for a current chroma block of video data indicating candidate intra-prediction modes for the current chroma block, wherein the intra-prediction candidate list indicates a subset of allowed luminance (luma) candidate intra-prediction modes; determining cost values for each of the candidate intra-prediction modes indicated by the intra-prediction candidate list for the current chroma block; and generating a prediction block for the current chroma block using one of the candidate intra-prediction modes indicated by the intra-prediction candidate list according to the cost values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
constructing, during a video decoding process, an intra-prediction candidate list for a current chroma block of video data indicating candidate intra-prediction modes for the current chroma block, wherein constructing the intra-prediction candidate list comprises adding a subset of allowed luminance (luma) candidate intra-prediction modes, an intra-prediction mode of a luma block corresponding to the current chroma block, and an intra-prediction mode of a neighboring block to the current chroma block to the intra-prediction candidate list;
determining, during the video decoding process, a respective cost value for each of the candidate intra-prediction modes indicated by the intra-prediction candidate list for the current chroma block, the cost values representing differences between a reconstructed version of the luma block and prediction blocks for the reconstructed version of the luma block generated using the respective intra-prediction modes, wherein determining the cost values comprises calculating the cost values for the intra-prediction candidate list once for the current chroma block, without modifying the intra-prediction candidate list after calculating any of the cost values for the intra-prediction candidate list for the current chroma block and without performing an iterative search to determine a decoder-side direct mode (DDM) for the current chroma block;
generating, during the video decoding process, a prediction block for the current chroma block using one of the candidate intra-prediction modes indicated by the intra-prediction candidate list according to the cost values; and
decoding, during the video decoding process, the current chroma block using the prediction block.

2. The method of claim 1, wherein the cost values comprise sum of absolute transform difference (SATD) values.

3. The method of claim 1, wherein generating the prediction block comprises generating the prediction block using the one of the candidate intra-prediction modes indicated by the intra-prediction candidate list having the lowest cost value.

4. The method of claim 1, wherein constructing the intra-prediction candidate list comprises adding one or more default intra-prediction modes to the intra-prediction candidate list, the default intra-prediction modes comprising DC mode, planar mode, horizontal mode, and vertical mode.

5. The method of claim 1, wherein constructing the intra-prediction candidate list comprises:
adding a first set of one or more angular intra-prediction modes to the intra-prediction candidate list corresponding to angular intra-prediction modes of one or more neighboring blocks to the current chroma block or a luma block co-located with the current chroma block; and
adding a second set of one or more angular intra-prediction modes to the intra-prediction candidate list, each of the second set of one or more angular intra-prediction modes having an angle close to an angle of at least one of the intra-prediction modes of the first set.

6. The method of claim 5, wherein adding the second set of one or more angular intra-prediction modes comprises adding angular intra-prediction modes to the intra-prediction candidate list having angles within one angular unit of an angle of at least one of the intra-prediction modes of the first set.

7. The method of claim 1, wherein constructing the intra-prediction candidate list comprises determining candidate intra-prediction modes to add to the intra-prediction candidate list according to one or more of an intra-prediction mode of a luma block co-located with the current chroma block, a size of the current chroma block, a transform type used to transform samples of the current chroma block, or decoded transform coefficients for the current chroma block.

8. The method of claim 1, wherein the neighboring block comprises one of a left-neighboring block, an above-neighboring block, an above-left neighboring block, an above-right neighboring block, or a below-left neighboring block.

9. The method of claim 1, wherein determining the cost values comprises:
downsampling a reconstructed luma block co-located with the current chroma block; and
for each candidate intra-prediction mode in the intra-prediction candidate list:
generating a prediction block using the candidate intra-prediction mode corresponding to the downsampled reconstructed luma block; and
calculating the cost value for the candidate intra-prediction mode between the generated prediction block and the downsampled reconstructed luma block.

10. The method of claim 9, wherein downsampling comprises selecting a downsampling ratio for the luma block from a plurality of different available downsampling ratios.

11. The method of claim 1, wherein determining the cost values comprises:
generating a reference block from one or more neighboring chroma blocks indicated by a template; and
for each candidate intra-prediction mode in the intra-prediction candidate list:
generating a prediction block of the reference block using the candidate intra-prediction mode; and calculating the cost value for the candidate intra-prediction mode between the generated prediction block and the reference block.

12. The method of claim 1, further comprising decoding a syntax element having a value indicating whether the current chroma block is to be predicted using cross-component linear mode (CCLM) or decoder-side derived direct mode (DDM).

13. The method of claim 12, wherein the value of the syntax element further indicates whether the current chroma block is to be predicted using direct mode from a co-located luma block.

14. The method of claim 1, wherein constructing the intra-prediction candidate list consists of adding cross-component linear mode (CCLM) and a derived direction mode to the intra-prediction candidate list.

15. The method of claim 1, wherein generating the prediction block for the current chroma block comprises generating a first prediction block for a first sub-block of the current chroma block using the intra-prediction candidate list having the lowest cost value, the method further comprising generating a second prediction block for a second sub-block of the current chroma block using a different intra-prediction mode.

16. A video decoding device for decoding video data, the video decoding device comprising:
a memory for storing video data; and
one or more processors implemented in circuitry and configured to:
construct, during a video decoding process, an intra-prediction candidate list for a current chroma block of the video data indicating candidate intra-prediction modes for the current chroma block, wherein to construct the intra-prediction candidate list, the one or more processors are configured to add a subset of allowed luminance (luma) candidate intra-prediction modes, an intra-prediction mode of a luma block corresponding to the current chroma block, and an intra-prediction mode of a neighboring block to the current chroma block to the intra-prediction candidate list;
determine, during the video decoding process, a respective cost value for each of the candidate intra-prediction modes indicated by the intra-prediction candidate list for the current chroma block, the cost values representing differences between a reconstructed version of the luma block and prediction blocks for the reconstructed version of the luma block generated using the respective intra-prediction modes, wherein to determine the cost values, the one or more processors are configured to calculate the cost values for the intra-prediction candidate list once for the current chroma block, without modifying the intra-prediction candidate list after calculating any of the cost values for the intra-prediction candidate list for the current chroma block and without performing an iterative search to determine a decoder-side direct mode (DDM) for the current chroma block;
generate, during the video decoding process, a prediction block for the current chroma block using one of the candidate intra-prediction modes indicated by the intra-prediction candidate list according to the cost values; and
decode, during the video decoding process, the current chroma block using the prediction block.

17. The video decoding device of claim 16, wherein to construct the intra-prediction candidate list, the one or more processors are configured to add one or more default intra-prediction modes to the intra-prediction candidate list, the default intra-prediction modes comprising DC mode, planar mode, horizontal mode, and vertical mode.

18. The video decoding device of claim 16, wherein to construct the intra-prediction candidate list, the one or more processors are configured to:
add a first set of one or more angular intra-prediction modes to the intra-prediction candidate list corresponding to angular intra-prediction modes of one or more neighboring blocks to the current chroma block or a luma block co-located with the current chroma block; and
add a second set of one or more angular intra-prediction modes to the intra-prediction candidate list, each of the second set of one or more angular intra-prediction modes having an angle close to an angle of at least one of the intra-prediction modes of the first set.

19. The video decoding device of claim 16, wherein to construct the intra-prediction candidate list, the one or more processors are configured to determine candidate intra-prediction modes to add to the intra-prediction candidate list according to one or more of an intra-prediction mode of a luma block co-located with the current chroma block, a size of the current chroma block, a transform type used to transform samples of the current chroma block, or decoded transform coefficients for the current chroma block.

20. The video decoding device of claim 16, wherein to determine the cost values, the one or more processors are configured to:
downsample a reconstructed luma block co-located with the current chroma block; and
for each candidate intra-prediction mode in the intra-prediction candidate list:
generate a prediction block using the candidate intra-prediction mode corresponding to the downsampled reconstructed luma block; and
calculate the cost value for the candidate intra-prediction mode between the generated prediction block and the downsampled reconstructed luma block.

21. The video decoding device of claim 16, wherein to determine the cost values, the one or more processors are configured to:
generate a reference block from one or more neighboring chroma blocks indicated by a template; and
for each candidate intra-prediction mode in the intra-prediction candidate list:
generate a prediction block of the reference block using the candidate intra-prediction mode; and
calculate the cost value for the candidate intra-prediction mode between the generated prediction block and the reference block.

22. The video decoding device of claim 16, wherein the one or more processors are configured to generate a first prediction block for a first sub-block of the current chroma block using the intra-prediction candidate list having the lowest cost value, and to generate a second prediction block for a second sub-block of the current chroma block using a different intra-prediction mode.

23. The video decoding device of claim 16, further comprising a display configured to display a picture of the video data.

24. The video decoding device of claim 16, wherein the video decoding device comprises one or more of a camera, a computer, a mobile device, a broadcast receiver device, or a set-top box.

25. A device for decoding video data, the device comprising:
- means for constructing, during a video decoding process, an intra-prediction candidate list for a current chroma block of video data indicating candidate intra-prediction modes for the current chroma block, wherein the means for constructing the intra-prediction candidate list comprises means for adding a subset of allowed luminance (luma) candidate intra-prediction modes, an intra-prediction mode of a luma block corresponding to the current chroma block, and an intra-prediction mode of a neighboring block to the current chroma block to the intra-prediction candidate list;
- means for determining, during the video decoding process, a respective cost value for each of the candidate intra-prediction modes indicated by the intra-prediction candidate list for the current chroma block, the cost values representing differences between a reconstructed version of the luma block and prediction blocks for the reconstructed version of the luma block generated using the respective intra-prediction modes, wherein the means for determining the cost values comprises means for calculating the cost values for the intra-prediction candidate list once for the current chroma block, without modifying the intra-prediction candidate list after calculating any of the cost values for the intra-prediction candidate list for the current chroma block and without performing an iterative search to determine a decoder-side direct mode (DDM) for the current chroma block;
- means for generating, during the video decoding process, a prediction block for the current chroma block using one of the candidate intra-prediction modes indicated by the intra-prediction candidate list according to the cost values; and
- means for decoding, during the video decoding process, the current chroma block using the prediction block.

26. A non-transitory computer-readable storage medium having stored thereon instructions that, when executed, cause a processor to:
- construct, during a video decoding process, an intra-prediction candidate list for a current chroma block of video data indicating candidate intra-prediction modes for the current chroma block, wherein the instructions that cause the processor to construct the intra-prediction candidate list comprise instructions that cause the processor to add a subset of allowed luminance (luma) candidate intra-prediction modes, an intra-prediction mode of a luma block corresponding to the current chroma block, and an intra-prediction mode of a neighboring block to the current chroma block to the intra-prediction candidate list;
- determine, during the video decoding process, sum of absolute transform difference (SATD) values for each of the candidate intra-prediction modes in the intra-prediction candidate list for the current chroma block, the cost values representing differences between a reconstructed version of the luma block and prediction blocks for the reconstructed version of the luma block generated using the respective intra-prediction modes, wherein the instructions that cause the processor to determine the cost values comprise instructions that cause the processor to calculate the cost values for the intra-prediction candidate list once for the current chroma block, without modifying the intra-prediction candidate list after calculating any of the cost values for the intra-prediction candidate list for the current chroma block and without performing an iterative search to determine a decoder-side direct mode (DDM) for the current chroma block;
- generate, during the video decoding process, a prediction block for the current chroma block using one of the candidate intra-prediction modes indicated by the intra-prediction candidate list according to the cost values; and
- decode, during the video decoding process, the current chroma block using the prediction block.

\* \* \* \* \*